United States Patent
Su et al.

(10) Patent No.: US 8,532,109 B2
(45) Date of Patent: Sep. 10, 2013

(54) METHODS AND SYSTEMS FOR REROUTE AND GENERATION OF BACKWARD ROUTING INFORMATION

(75) Inventors: Hui-Kai Su, Chiayi County (TW); Ming-Ta Yang, Hsincu (TW); Cheng-Shong Wu, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 731 days.

(21) Appl. No.: 12/651,346

(22) Filed: Dec. 31, 2009

(65) Prior Publication Data

US 2011/0116506 A1    May 19, 2011

(30) Foreign Application Priority Data

Nov. 19, 2009  (TW) ............................ 98139270 A

(51) Int. Cl.
*H04L 12/28* (2006.01)

(52) U.S. Cl.
USPC ............................ 370/392; 370/238; 709/239

(58) Field of Classification Search
USPC .................... 370/392, 238, 216; 709/239
See application file for complete search history.

(56) References Cited

U.S. PATENT DOCUMENTS

| | | | |
|---|---|---|---|
| 8,009,556 B2* | 8/2011 | May | 370/219 |
| 8,134,920 B2* | 3/2012 | Imajuku et al. | 370/228 |
| 2006/0221813 A1 | 10/2006 | Scudder et al. | |
| 2009/0046587 A1* | 2/2009 | Kothari et al. | 370/238 |

OTHER PUBLICATIONS

"Basic Specification for IP Fast Reroute: Loop-Free Alternates," Sep. 2008, pp. 1-24, US.
"IP Fast Reroute Using Not-via Addresses," Oct. 2008, pp. 1-21, US.
"OSPFv2 Extensions for Link Capabilities to support U-turn Alternated for IP/LDP Fast-Reroute," Feb. 2006, pp. 1-8, US.
"IP Fast Reroute Using Tunnels", Apr. 2005, pp. 1-21, US.
Srihari Nelakuditi et al. "Fast Local Rerouting for Handling Transient Link Failures," ACM Transactions on Networking, Apr. 2007, pp. 359-372, vol. 15, No. 2, IEEE, US.

* cited by examiner

*Primary Examiner* — Wei Zhao

(57) ABSTRACT

Methods and systems for reroute and generation of backward routing information are provided. When an originator node wants to transmit a packet to a destination node and cannot transmit the packet to a next node recorded in a routing table, the originator node records a backward packet tag and information of the originator node into the packet, and transmits the edited packet to a backup node recorded in the routing table. The backup node retrieves a backward routing table in response to the backward packet tag to see whether a forwarding node corresponding to the originator node and the destination node is a backward routing terminal. If not, the backup node transmits the packet to the forwarding node. If so, the backup node removes the backward packet tag and the information of the originator node from the packet, and transmits the packet to the forwarding node.

20 Claims, 10 Drawing Sheets

METHODS AND SYSTEMS FOR REROUTE AND GENERATION OF BACKWARD ROUTING INFORMATION

CROSS REFERENCE TO RELATED APPLICATIONS

This application claims priority of Taiwan Patent Application No. 098139270, filed on Nov. 19, 2009, the entirety of which is incorporated by reference herein.

BACKGROUND OF THE INVENTION

1. Field of the Invention

The disclosure relates generally to route management, and, more particularly to reroute methods and systems that perform backward routing based on destination tree, and methods for generation of backward routing information.

2. Description of the Related Art

Since ARPANET, IP (Internet Protocol) network has equipped with response network recovery ability. That is, once a node or a connection is broken down, the IP network can automatically trigger to update route. Network nodes, such as routers can exchange new routing information via IGP (Interior Gateway Protocol), such that the routing information of respective nodes can be converged into a new and best condition.

Generally, the convergence process of the routing information includes error detection, information propagation, route calculation, and routing table update. The error detection can be triggered from the physical layer/data link layer or the network layer. Conventionally, the error detection triggered from the physical layer/data link layer needs hundreds of milliseconds. In the error detection triggered from the network layer based on RIP (Routing Information Protocol), routing information is exchanged every 30 seconds, and a route is presumed as invalid when the routing information is not updated in 180 seconds. In the error detection triggered from the network layer based on OSPF (Open Shortest Path First), routing information is exchanged every 10 seconds, and a router is presumed as breakdown when no response is received from the router in 40 seconds. Since the routing information must be propagated through the network, the transmission of routing information needs about 10 ms~100 ms for passing through each router. The synchronization time for network is expanded with the network size. The time for route calculation and routing table update is based on the processing ability of the router, and the corresponding algorithm. Further, the time for route calculation and routing table update is also influenced by the network size and the amount of routing information. Therefore, for general IP networks, the route recovery time when the connection or node is broken down is time-consuming. The network recovery speed cannot fulfill the requirement of real-time applications. For example, the network breakdown time for a network telephone application must be less than 200 ms~450 ms, and the network breakdown time for a multimedia streaming application must be less than 1 sec~30 sec.

Additionally, since the IP network is limited by shortest path route and hop-by-hop, most mechanisms of backup route calculation based on area information cannot achieve satisfactory protection results. Further, the protection mechanisms for connection-oriented networks, such as SONET, ATM, MPLS are not suitable for backup route calculation of IP network, since source routing is adopted in the connection-oriented networks, and the backup path can be therefore defined and built in advance. As described, since the IP network is limited by shortest path route and hop-by-hop, only a backup next node can be calculated. The next node of the calculated backup next node then follows the shortest path route rule to transmit packets to a destination node. Therefore, how to avoid a routing loop during rerouting is an important issue in IP network.

BRIEF SUMMARY OF THE INVENTION

Methods and systems for reroute and generation of backward routing information are provided.

In an embodiment of a reroute method, an originator node having a routing table is provided. The routing table at least records at least a next node corresponding to a destination node, a backup node, and a backward routing tag representing whether the backup node belongs to a backward route protection. When the originator node wants to transmit a packet to the destination node, it is determined whether the packet cannot be transmitted to the next node. When the packet cannot be transmitted to the next node, the originator node edits the packet to record a backward packet tag and information of the originator node into the packet, and transmits the edited packet to the backup node.

In an embodiment of a reroute method, a backup node receives and parses a packet to obtain an originator node, a destination node, and a backward packet tag recorded in the packet. The backup node retrieves a backward routing table in response to the backward packet tag. The backward routing table at least records a forwarding node corresponding to the originator node and the destination node, and a terminal tag representing whether the forwarding node is a backward routing terminal. When the terminal tag represents the forwarding node is not a backward routing terminal, the backup node transmits the packet to the forwarding node.

In an embodiment of a method for generation of backward routing information, a destination tree from a set of nodes comprising a backup node corresponding to an originator node and a destination node is built, wherein the originator node first transmits a packet to a next node connected with the originator node when the originator node wants to transmit the packet to the destination node. Then, based on presupposition of a connection breakdown between the originator node and the next node, the destination tree is divided into a first sub-destination tree including the originator node, and a second sub-destination tree including the destination node, and a shortest path from the originator node to the destination node is accordingly generated. Then, it is determined whether the shortest path passes through the backup node. When the shortest path passes through the backup node, a specific node next to the backup node in the shortest path is recorded as a forwarding node corresponding to the originator node and the destination node in a backward routing table. It is determined whether the specific node belongs to the second sub-destination tree. When the specific node belongs to the second sub-destination tree, a terminal tag representing the specific node is a backward routing terminal is recorded in the backward routing table.

An embodiment of a reroute system includes an originator node having a storage unit and a processing unit. The storage unit includes a routing table. The routing table at least records at least a next node corresponding to a destination node, a backup node, and a backward routing tag representing whether the backup node belongs to a backward route protection. When the originator node wants to transmit a packet to the destination node, the processing unit determines whether the packet cannot be transmitted to the next node. When the packet cannot be transmitted to the next node, the processing unit edits the packet to record a backward packet tag and information of the originator node into the packet, and transmits the edited packet to the backup node.

An embodiment of a reroute system includes a backup node having a storage unit and a processing unit. The storage unit includes a backward routing table. The backward routing table at least records a forwarding node corresponding to the originator node and the destination node, and a terminal tag representing whether the forwarding node is a backward routing terminal. The processing unit receives and parses a packet to obtain an originator node, a destination node, and a backward packet tag recorded in the packet, and retrieves the backward routing table in response to the backward packet tag. When the terminal tag represents the forwarding node is not a backward routing terminal, the processing unit transmits the packet to the forwarding node.

In some embodiments, when the terminal tag represents the forwarding node is a backward routing terminal, the backup node edits the packet to remove the backward packet tag and the information of the originator node from the packet, and transmits the packet to the forwarding node.

In some embodiments, the backward packet tag is recorded in a TOS (Type Of Service) field or a traffic class field of a header of the packet. In some embodiments, the information of the originator node is recorded in an option filed or an extension header field of the header of the packet.

Methods for reroute and generation of backward routing information may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for reroute and generation of backward routing information are provided.

Figure 1:
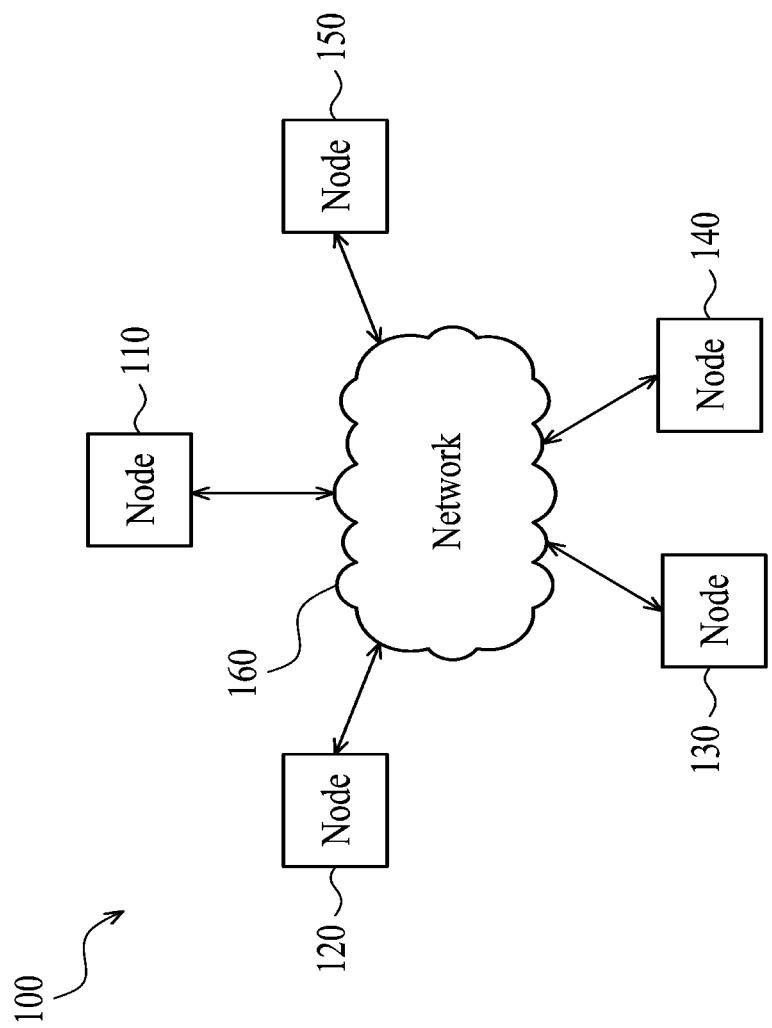
FIG. 1 is a schematic diagram illustrating an embodiment of a reroute system of the invention.

FIG. 1 is a schematic diagram illustrating an embodiment of a reroute system of the invention. The reroute system 100 comprises a plurality of nodes (110, 120, 130, 140 and 150). The respective nodes may be wired or wireless to connect with each other and transmit packets based on a routing mechanism via the architecture of a network 160.

Figure 2:
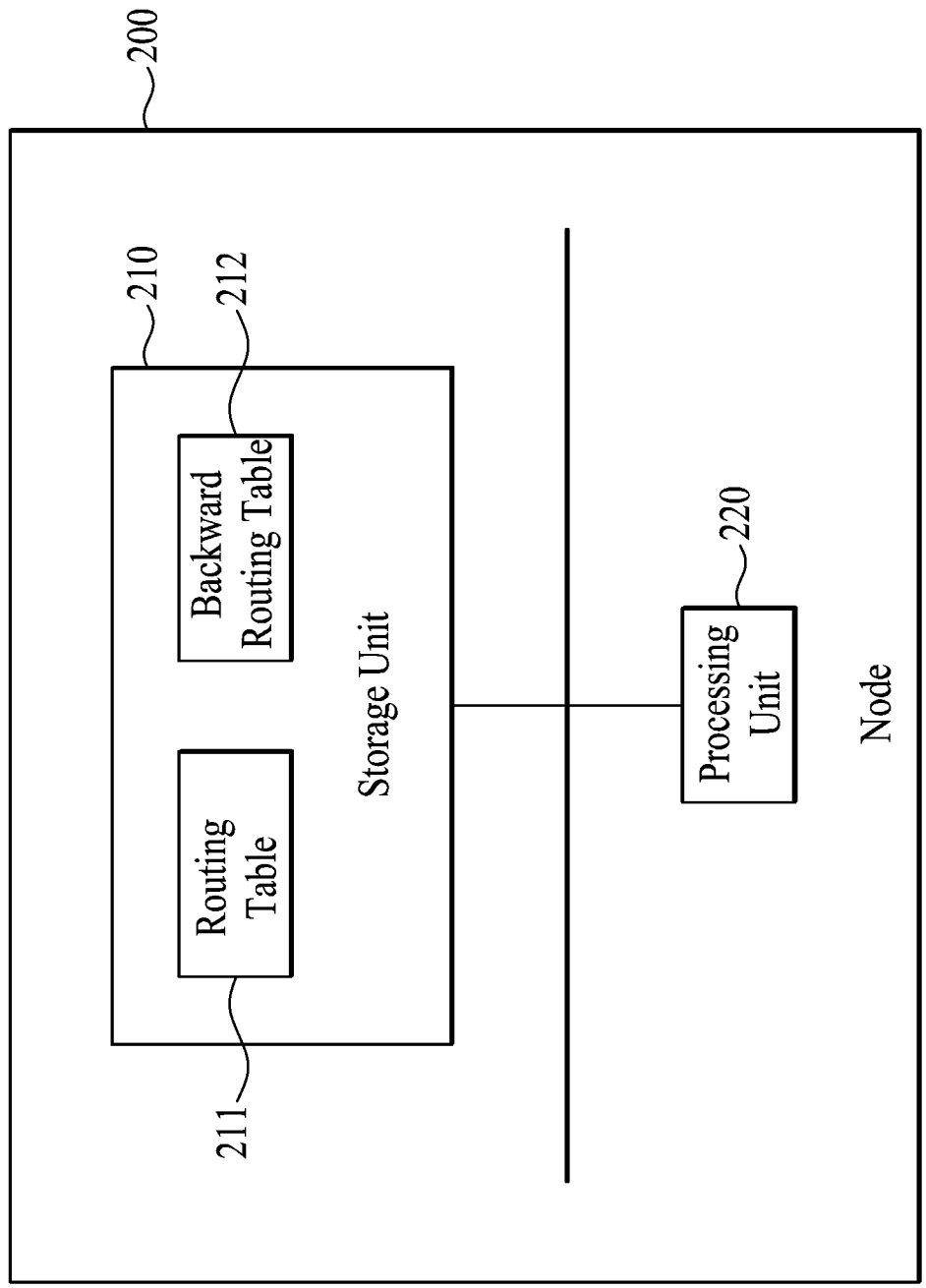
FIG. 2 is a schematic diagram illustrating an embodiment of a node of the invention.
Figure 3:
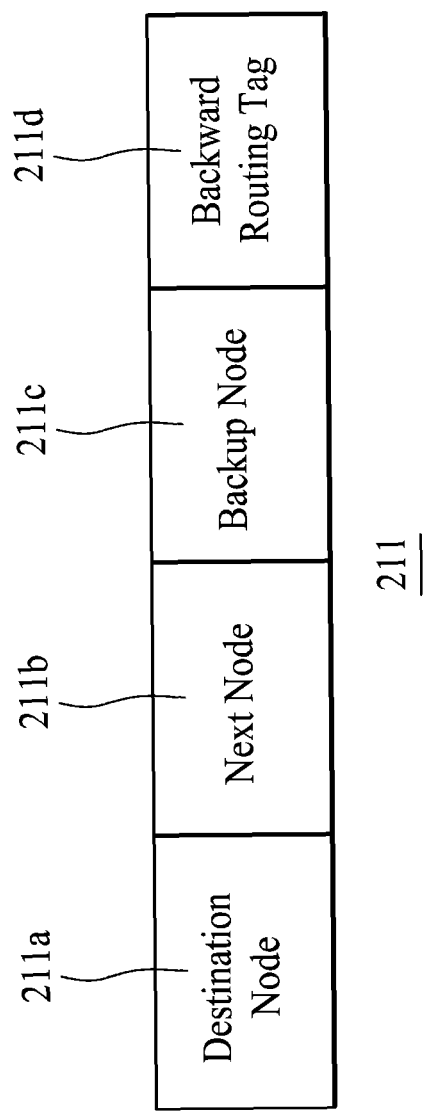
FIG. 3 is a schematic diagram illustrating an embodiment of the data structure of a routing table of the invention.
Figure 4:
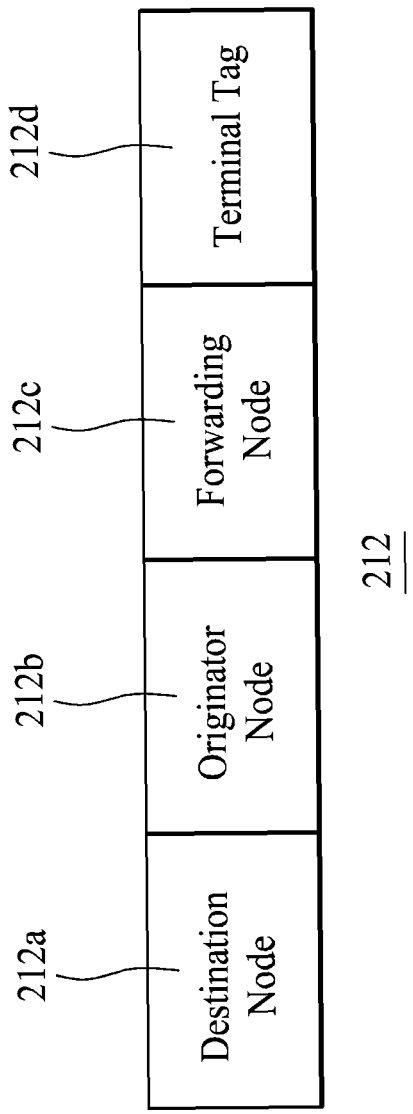
FIG. 4 is a schematic diagram illustrating an embodiment of the data structure of a backward routing table of the invention.

FIG. 2 is a schematic diagram illustrating an embodiment of a node of the invention. The node 200 may be a processor-based electronic device, such as a router. The node 200 comprises a storage unit 210 and a processing unit 220. It is noted that, the node 200 may also comprise a network connection unit (not shown) to receive and transmit data packets via the network. The storage unit 210 can comprise a routing table 211 and a backward routing table 211. FIG. 3 is a schematic diagram illustrating an embodiment of the data structure of a routing table of the invention. As shown in FIG. 3, the data structure of the routing table 211 comprises a destination node 211a, a next node 211b, a backup node 211c, and a backward routing tag 211d. It is understood that, only specific information of the routing table 211 is shown for explanation convenience. In some embodiments, the routing table 211 may also comprise an IP address and a network mask for the corresponding node, related network costs, and other information. When a packet is expected to be transmitted to the destination node 211a, the node must transmit the packet to the next node 211b. When the node cannot transmit the packet to the next node 211b or a connection breakdown occurs between the node and the next node 211b, the node transmits the packet to the backup node 211c. The backward routing tag 211d records/represents whether the backup node 211c belongs to a backward route protection. In some embodiments, the backup node 211c is a forward route protection when the backward routing tag 211d is "0", and the backup node 211c is a backward route protection when the backward routing tag 211d is "1". The generation and use of the routing table 211 will be discussed in the following paragraphs. FIG. 4 is a schematic diagram illustrating an embodiment of the data structure of a backward routing table of the invention. As shown in FIG. 4, the data structure of the backward routing table 212 comprises a destination node 212a, an originator node 212b, a forwarding node 212c, and a terminal tag 212d. When the originator node 212b triggers backward routing, and wants to transmit a packet to the destination node 212a, the node must transmit the packet to the forwarding node 212c. The terminal tag 212d records/represents whether the forwarding node is a backward routing terminal. That is, when the forwarding node 212c is a backward routing terminal, the packet will be processed and transmitted based on forward routing after the forwarding node 212c. In some embodiments, the forwarding node 212c is not a backward routing terminal when the terminal tag 212d is "0", and the forwarding node 212c is a backward routing terminal when the terminal tag 212d is "1". The generation and use of the backward routing table 212 will be discussed in the following paragraphs. The processing unit performs the methods for reroute and generation of backward routing information of the invention, which will be further discussed in the following paragraphs.

Figure 5:
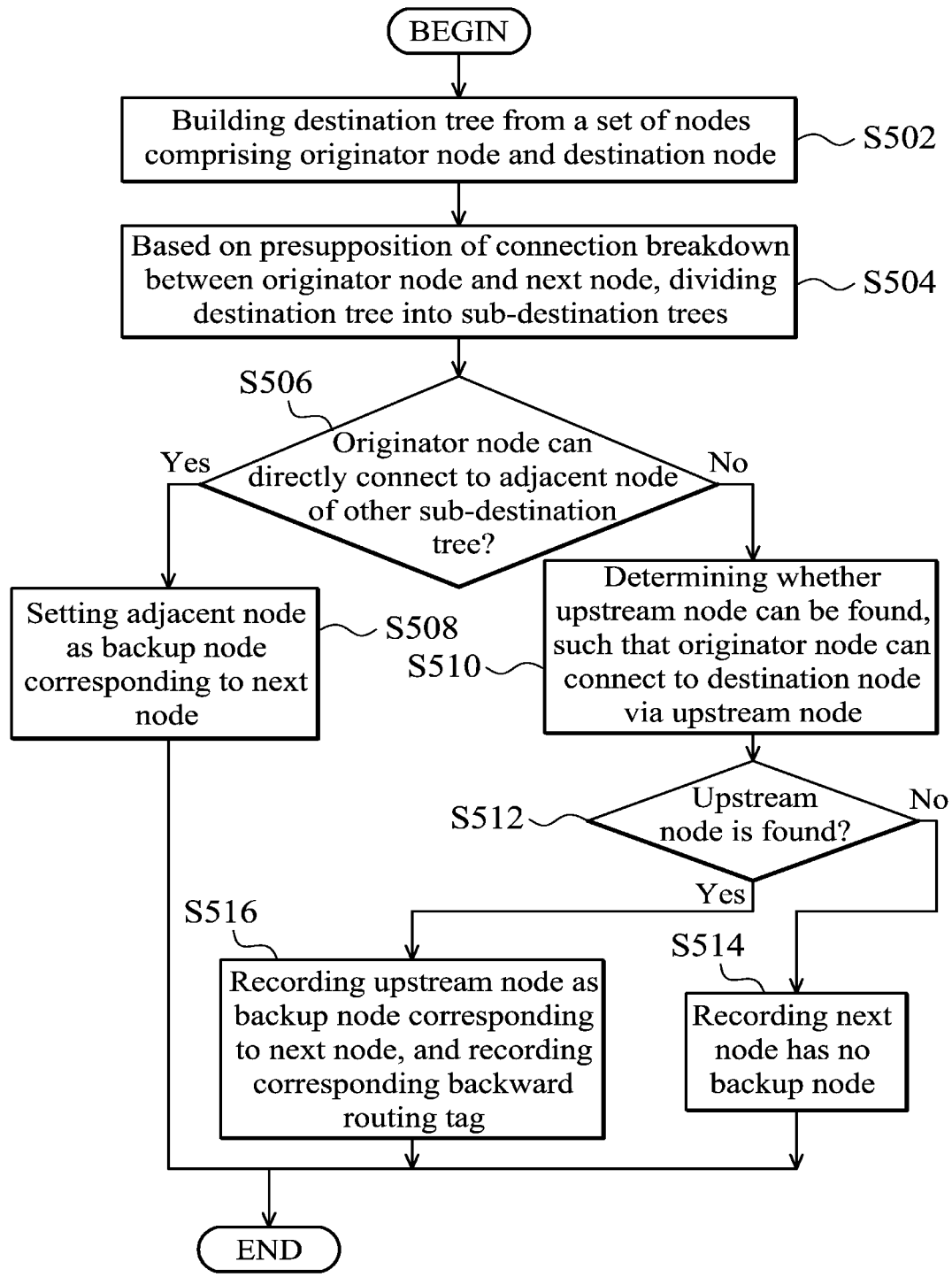
FIG. 5 is a flowchart of an embodiment of a method for generation of routing of the invention.

FIG. 5 is a flowchart of an embodiment of a method for generation of routing information of the invention. In this embodiment, an originator node can establish a backup node for a next node of the originator node, such that a destination node can be reached via the backup node, and it is determined whether the backup node belongs to backward routing.

In step S502, a destination tree from a set of nodes comprising the originator node and the destination node is built. It is noted that, the practice for building a destination tree from a set of nodes are well known, and the details are omitted herefrom. After the destination tree is built, the originator node will know a next node, wherein the originator node must first transmits a packet to the next node connected with the originator node when the originator node wants to transmit the packet to the destination node. In step S504, based on presupposition of a connection breakdown between the originator node and the next node, the destination tree is divided into at least two sub-destination trees, wherein a first sub-destination tree may include the originator node, and a second sub-destination tree may include the destination node. In step S506, it is determined whether the originator node can directly connect to an adjacent node of the second sub-destination tree. When the originator node can directly connect to an adjacent node of the second sub-destination tree (Yes in step S506), in step S508, the adjacent node is set as the backup node corresponding to the next node. It is understood that, in some embodiments, the backward routing tag corresponding to the backup node can be recorded as "0", representing the backup node is a route protection. Note that, when the originator node can directly connect to several adjacent nodes of the second sub-destination tree, one of the adjacent nodes with lowest cost, such as shortest path can be selected. When the originator node cannot directly connect to an adjacent node of the second sub-destination tree (No in step S506), in step S510, it is determined whether a upstream node can be found from the destination tree, such that the originator node can connect to the destination node via the upstream node. When no upstream node can be found (No in step S512), in step S514, it is recorded that the next node has no backup node. In some embodiments, the backup node corresponding to the next node can be recorded as "−1", representing the backup node for the next node does not exist. When an upstream node can be found (Yes in step S512), in step S516, the upstream node is recorded as the backup node corresponding to the next node, and the backward routing tag corresponding to the backup node can be recorded as "1", representing the backup node is a backward route protection.

Figure 7A:
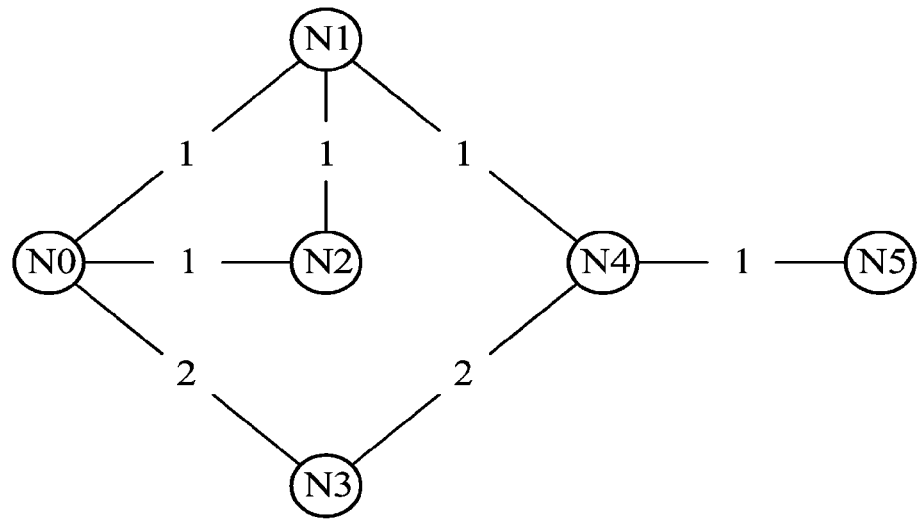
FIG. 7A shows an example of a network.
Figure 7B:
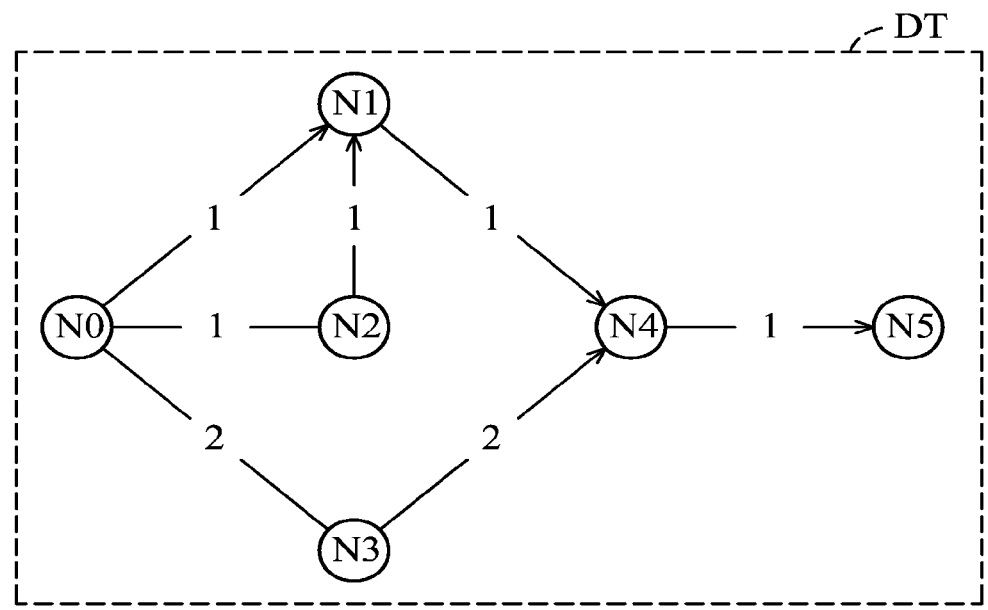
FIG. 7B shows a shortest destination tree from node N0 to node N5 in FIG. 7A.
Figure 7C:
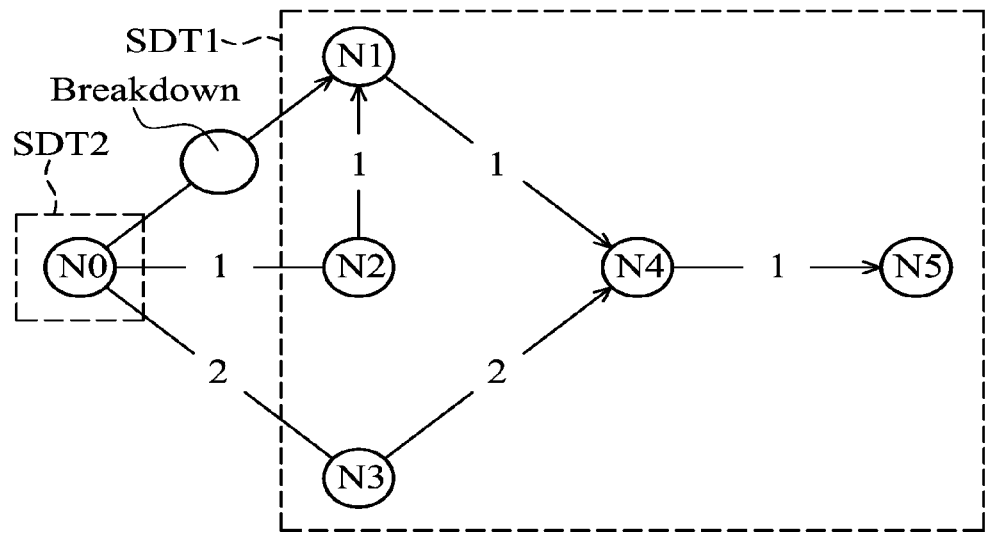
FIG. 7C shows sub-destination trees generated based on a connection breakdown between node N0 and node N1 of the destination tree in FIG. 7B.

An example follows. FIG. 7A shows an example of a network. The network includes nodes N0~N5, the connections between nodes are bi-direction, and the corresponding connection costs are respectively shown on the connections between nodes. After IGP convergence, the destination node and the corresponding next node in the routing table of respective node can be automatically established. Therefore, each node in the network can know the data flow of the network, and the hop-by-hop paths to respective destinations. In the backup node calculation of the routing table, the backup path from node N0 to node N5 for example, node N0 can build a shortest destination tree DT for node N5, as show in FIG. 7B. Then, based on presupposition of a connection breakdown between node N0 and a next node (node N1) in the path to node N5, the shortest destination tree corresponding to node N5 is divided into two sub-destination trees, node N5 sub-destination tree SDT1, and node N0 sub-destination tree SDT2, as shown in FIG. 7C. In the of a connection breakdown between node N0 and a next node (node N1) in the path to node N5, if node N0 can find an adjacent node with shortest path to connect with the node N5 sub-destination tree SDT1, the adjacent node can be set as the backup node of the next node. For example, in FIG. 7C, node N2 is selected as the backup node of node N1 for the backup path from node N0 to node N5.

It is noted that, each originator node can establish corresponding backup nodes for the next nodes in the path to respective destination nodes, and determine whether the respective backup node belongs to backward routing, such that a complete routing table can be obtained. Noted that, if no suitable backup node can be found, a backward route protection can be calculated.

Figure 6:
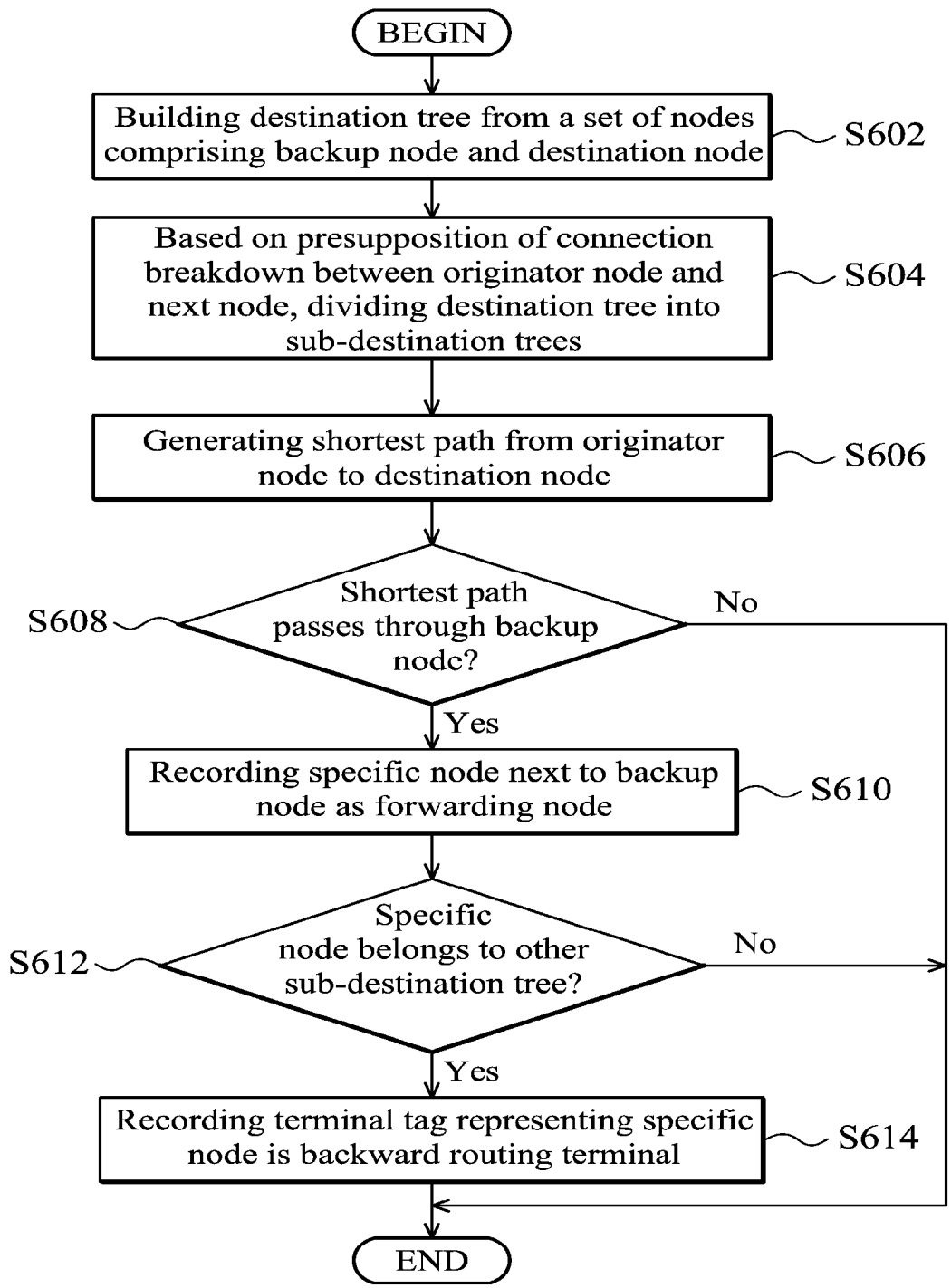
FIG. 6 is a flowchart of an embodiment of a method for generation of backward routing information of the invention.

FIG. 6 is a flowchart of an embodiment of a method for generation of backward routing information of the invention. In this embodiment, a backup node corresponding to an originator node can calculate corresponding backward routing information based on presupposition of a connection breakdown between the originator node and a next node in the path to a destination node, wherein the originator node first transmits a packet to a next node connected with the originator node when the originator node wants to transmit the packet to the destination node.

In step S602, a destination tree from a set of nodes comprising the backup node and the destination node is built, and in step S604, based on presupposition of a connection breakdown between the originator node and the next node, the destination tree is divided into at least two sub-destination trees, wherein a first sub-destination tree can include the originator node, and a second sub-destination tree can include the destination node. In step S606, based on presupposition of a connection breakdown between the originator node and the next node, a shortest path from the originator node to the destination node is accordingly generated. In step S608, it is determined whether the shortest path passes the backup node. When the shortest path does not pass through the backup node (No in step S608), the procedure is completed. When the shortest path passes through the backup node (Yes in step S608), in step S610, a specific node next to the backup node in the shortest path is recorded as a forwarding node corresponding to the originator node and the destination node in the backward routing table. In step S612, it is determined whether the specific node belongs to the second sub-destination tree. When the specific node does not belong to the second sub-destination tree (No in step S612), the procedure is completed. When the specific node belongs to the second sub-destination tree (Yes in step S612), in step S614, a terminal tag representing the specific node is a backward routing terminal is recorded in the backward routing table. That is, when the backward route protection is performed, a packet will be processed and transmitted based on forward routing after the forwarding node (specific node).

Referring FIG. 7A again, node N0 can calculate backward routing information for all connections and nodes in the downstream of the path to the destination node N5. In this example, in addition to the route protection for the next node of node N0, the route protections for the next nodes of node N1 and N4 are also needed to be respectively calculated. In some embodiments, node N0 can calculate the route protections for the downstream nodes in sequence, until one of the nodes can perform forward route protection.

Figure 7D:
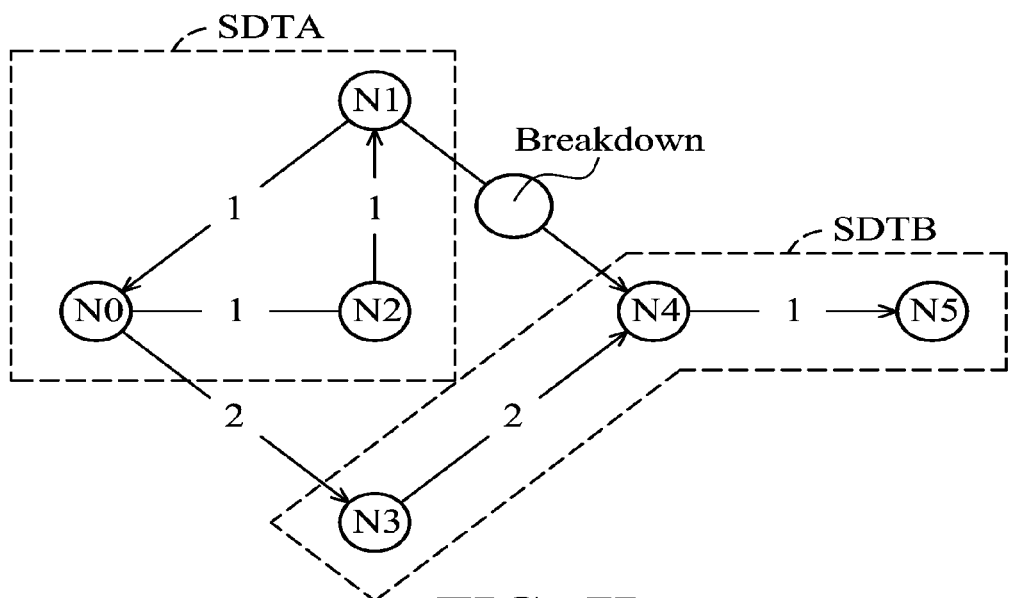
FIG. 7D shows a backward routing based on a connection breakdown between node N1 and node N4 in FIG. 7A.

In this example, node N0 can presume the connection between node N1 and a next node N4 of node N1 is broken down, as shown in FIG. 7D. It is understood that, in this example, node N0 may be the backup node in the embodiment of FIG. 6, node N1 may be the originator node in the embodiment of FIG. 6, node N4 may be the next node in the embodiment of FIG. 6, and node N5 may be the destination node in the embodiment of FIG. 6.

In this condition, node N5 shortest path tree is divided into two sub-destination node N1 sub-destination tree SDTA and node N5 sub-destination tree SDTB. Based on presupposition of a connection breakdown between the node N1 and the next node N4, node N1 can first try to perform the forward route protection, to find a backup next node in the downstream. However, in this example, node N1 cannot find a suitable backup next node. Therefore, node N0 can perform the backward route protection for node N1. In the backward route protection, a shortest path to the destination node N5 is expected to be found using the shortest path algorithm based on presupposition of a connection breakdown between the node N1 and the next node N4. If the shortest path can be found, and the shortest path passes through node N0 itself, node N0 can perform a unique backward routing for backward packets. In this example, the backward routing table of node N0 can record that the backward packet with the destination node N5 from the originator node N1 is transmitted to the forwarding node N3. Additionally, since the forwarding node N3 belongs to node N5 sub-destination tree SDTB including the destination node N5, the terminal tag corresponding to the forwarding node N3 is recorded as "1", representing node N3 is a terminal of the backward route protection (backward routing terminal).

It is understood that, a node must calculate corresponding backward backup nodes for all connections and nodes in the downstream of the paths to the respective destination nodes, such that a complete backward routing table can be obtained.

Figure 8:
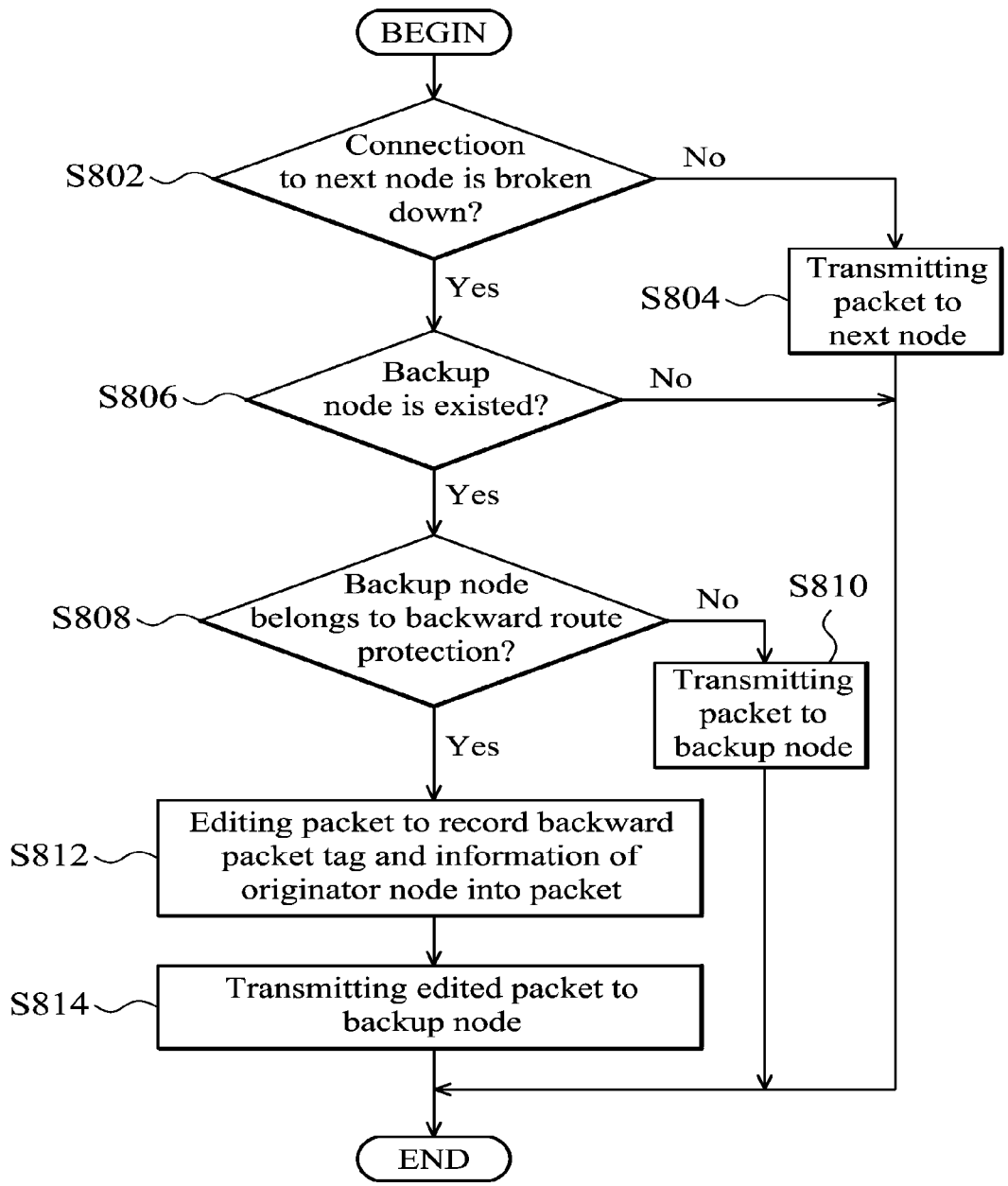
FIG. 8 is a flowchart of an embodiment of a reroute method of the invention.

FIG. 8 is a flowchart of an embodiment of a reroute method of the invention. In this embodiment, an originator node can perform routing management for packets according to a routing table. It is noted that, in some embodiments, the originator node can parses a packet, and perform routing management for the packet according to the routing table when no backward packet tag is recorded in the packet.

In step S802, it is determined whether a connection between the originator node and a next node, where a packet is expected to be transmitted, is broken down (or it is determined whether the originator node cannot transmit the packet to the next node). It is understood that, the originator node can parses the packet to obtain a destination node recorded in the packet, and retrieve the routing table according to the destination node to know the next node. When the connection between the originator node and the next node is not broken down (No in step S802), in step S804, the originator node transmits the packet to the next node. When the connection between the originator node and the next node is broken down (Yes in step S802), in step S806, it is determined whether a backup node for the next node is recorded in the routing table. When no backup node for the next node is recorded in the routing table (No in step S806), the procedure is completed. When a backup node for the next node is recorded in the routing table (Yes in step S806), in step S808, it is determined whether a backward routing tag corresponding to the backup node records the backup node belongs to a backward route protection. When the backup node does not belong to a backward route protection (No in step S808), in step S810, the originator node transmits the packet to the backup node. When the backup node belongs to a backward route protection (Yes in step S808), in step S812, the originator node edits the packet to record a backward packet tag corresponding to a backward routing tag and information of the originator node into the packet, and in step S814, transmits the edited packet to the backup node. It is understood that, in some embodiments, when the packet is an IPV4 packet, the backward packet tag can be recorded in a TOS (Type Of Service) field of a header of the packet, and the information of the originator node can be recorded in an option filed of the header of the packet. In some embodiments, when the packet is an IPV6 packet, the backward packet tag can be recorded in a traffic class field of a header of the packet, and the information of the originator node can be recorded in an extension header field of the header of the packet. It is noted that, the fields for recording the backward packet tag and the information of the originator node are only examples of the invention, the invention is not limited thereto.

Figure 9:
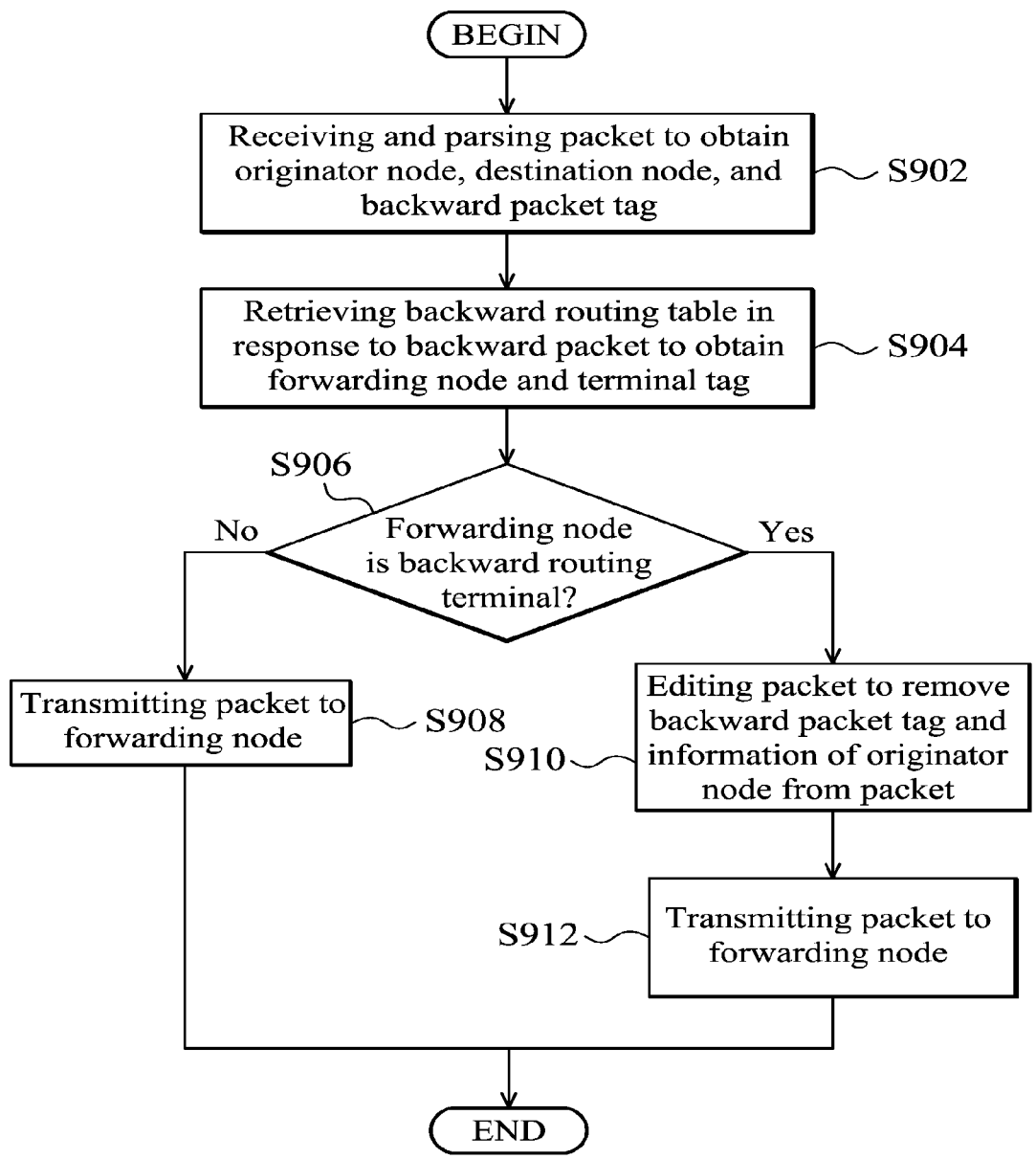
FIG. 9 is a flowchart of another embodiment of a reroute method of the invention.

FIG. 9 is a flowchart of another embodiment of a reroute method of the invention. In this embodiment, a backup node can perform routing management for packets according to a backward routing table.

In step S902, the backup node receives and parses a packet to obtain information of an originator node, a destination node, and a backward packet tag recorded in the packet. It is noted that, when no information of an originator node and no backward packet tag can be found in the packet, the packet will be processed according to the embodiment in FIG. 8. In step S904, in response to the backward packet tag, the backup node retrieves the backward routing table according to the originator node and the destination node, thus to obtain a corresponding forwarding node and a terminal tag. In step S906, it is determined whether the forwarding node is a backward routing terminal according to the terminal tag. When the forwarding node is not a backward routing terminal (No in step S906), in step S908, the backup node transmits the packet to the forwarding node. When the forwarding node is a backward routing terminal (Yes in step S906), in step S910, the backup node edits the packet to remove the backward packet tag and the information of the originator node from the packet, and in step S912, transmits the packet to the forwarding node.

After the forwarding node receives the packet, the forwarding node can parse the packet to obtain related information. When no information of an originator node and no backward packet tag can be found in the packet, the forwarding node can manage the packet according to the routing table. When information of an originator node and a backward packet tag can be found in the packet, the forwarding node can manage the packet according to the backward routing table.

Referring FIG. 7D again, when node N1 wants to transmit a packet to node N5, the connection between node N1 and N4 is broken down, node N1 can retrieve the routing table and realize the packet must be transmitted to the backup node N0, and the backup node N0 belongs to a backward route protection. Therefore, node N1 edits a backward packet tag and the information of the originator node (node N1) to the header of the packet, and transmits the edited packet to node N0. After node N0 receives the packet, node N0 can parse the packet to know the packet is a backward packet. Node N0 retrieves the backward routing table according to the destination node (node N5) and the originator node (node N1), to know a forwarding node N3, and node N3 is a terminal of the backward route protection. Therefore, node N0 removes the backward packet tag and the information of the originator node, and transmits the packet to node N3. After node N3 receives the packet, node N3 can forward the packet according to the general forward routing manner. After retrieving the routing table, node N3 can transmit the packet to node N4, and node N4 can transmit the packet to the destination node N5.

Therefore, the methods and systems for reroute and generation of backward routing information of the invention can calculate backward routing information based on destination trees, and reroute accordingly, such that the backup routing mechanism during connection breakdowns between nodes can be enhanced.

Methods for reroute and generation of backward routing information, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A reroute method, comprising:
   providing an originator node having a routing table, wherein the routing table at least records a next node corresponding to a destination node, a backup node, and a backward routing tag representing whether the backup node belongs to a backward route protection;
   determining whether a packet cannot be transmitted to the next node when the originator node wants to transmit the packet to the destination node;
   when the packet cannot be transmitted to the next node, editing the packet to record a backward packet tag and information of the originator node into the packet, and transmitting the edited packet to the backup node by the originator node;
   parsing the packet to obtain the originator node, the destination node, and the backward packet tag by the backup node;
   retrieving a backward routing table in response to the backward packet tag by the backup node, wherein the backward routing table at least records a forwarding node corresponding to the originator node and the destination node, and a terminal tag representing whether the forwarding node is a backward routing terminal; and
   when the terminal tag represents the forwarding node is not the backward routing terminal, transmitting the packet to the forwarding node by the backup node.

2. The method of claim 1, wherein when the terminal tag represents the forwarding node is the backward routing terminal, the method further comprising:
   editing the packet to remove the backward packet tag and the information of the originator node from the packet by the backup node; and
   transmitting the packet to the forwarding node by the backup node.

3. The method of claim 1, wherein the backward packet tag is recorded in a TOS (Type Of Service) field or a traffic class field of a header of the packet.

4. The method of claim 1, wherein the information of the originator node is recorded in an option filed or an extension header field of a header of the packet.

5. The method of claim 1, wherein the generation of the routing table comprises the steps of:
   building a destination tree from a set of nodes comprising the originator node and the destination node;
   based on presupposition of a connection breakdown between the originator node and the next node, dividing the destination tree into a first sub-destination tree including the originator node, and a second sub-destination tree including the destination node;
   determining whether the originator node can directly connect to an adjacent node of the second sub-destination tree;
   when the originator node cannot directly connect to the adjacent node of the second sub-destination tree, determining whether an upstream node can be found from the destination tree, such that the originator node can connect to the destination node via the upstream node; and
   when the upstream node can be found, recording the upstream node as the backup node in the routing table, and recording the backward routing tag corresponding to the backup node.

6. The method of claim 1, the generation of the backward routing table comprises the steps of:
   building a destination tree from a set of nodes comprising the backup node and the destination node;
   based on presupposition of a connection breakdown between the originator node and the next node, dividing the destination tree into a first sub-destination tree including the originator node, and a second sub-destination tree including the destination node;
   based on the presupposition of the connection breakdown between the originator node and the next node, generating a shortest path from the originator node to the destination node;
   determining whether the shortest path passes through the backup node;
   when the shortest path passes through the backup node, recording a specific node next to the backup node in the shortest path as the forwarding node corresponding to the originator node and the destination node in the backward routing table;
   determining whether the specific node belongs to the second sub-destination tree; and
   when the specific node belongs to the second sub-destination tree, recording a terminal tag representing the specific node is a backward routing terminal in the backward routing table.

7. A reroute method, comprising:
   receiving and parsing a packet to obtain an originator node, a destination node, and a backward packet tag recorded in the packet by a backup node;
   retrieving a backward routing table in response to the backward packet tag by the backup node, wherein the backward routing table at least records a forwarding node corresponding to the originator node and the destination node, and a terminal tag representing whether the forwarding node is a backward routing terminal;
   when the terminal tag represents the forwarding node is not the backward routing terminal, transmitting the packet to the forwarding node by the backup node;
   wherein when the terminal tag represents the forwarding node is the backward routing terminal, the method further comprising:
   editing the packet to remove the backward packet tag and the information of the originator node from the packet by the backup node; and
   transmitting the packet to the forwarding node by the backup node.

8. The method of claim 7, wherein the backward packet tag is recorded in a TOS (Type Of Service) field or a traffic class field of a header of the packet.

9. The method of claim 7, wherein the information of the originator node is recorded in an option filed or an extension header field of a header of the packet.

10. A computer-implemented method for generation of backward routing information for use in a computer, wherein the computer is programmed to perform the steps of:
  building a destination tree from a set of nodes comprising a backup node corresponding to an originator node and a destination node, wherein the originator node first transmits a packet to a next node connected with the originator node when the originator node wants to transmit the packet to the destination node;
  based on presupposition of a connection breakdown between the originator node and the next node, dividing the destination tree into a first sub-destination tree including the originator node, and a second sub-destination tree including the destination node;
  based on the presupposition of the connection breakdown between the originator node and the next node, generating a shortest path from the originator node to the destination node;
  determining whether the shortest path passes through the backup node;
  when the shortest path passes through the backup node, recording a specific node next to the backup node in the shortest path as the forwarding node corresponding to the originator node and the destination node in a backward routing table;
  determining whether the specific node belongs to the second sub-destination tree; and
  when the specific node belongs to the second sub-destination tree, recording a terminal tag representing the specific node is a backward routing terminal in the backward routing table.

11. A reroute system, comprising:
  an originator node, comprising:
    a storage unit comprising a routing table, wherein the routing table at least records a next node corresponding to a destination node, a backup node, and a backward routing tag representing whether the backup node belongs to a backward route protection;
    a processing unit determining whether a packet cannot be transmitted to the next node when the originator node wants to transmit the packet to the destination node, and when the packet cannot be transmitted to the next node, editing the packet to record a backward packet tag and information of the originator node into the packet, and transmitting the edited packet to the backup node;
  wherein the backup node comprises:
    a storage unit comprising a backward routing table, wherein the backward routing table at least records a forwarding node corresponding to the originator node and the destination node, and a terminal tag representing whether the forwarding node is a backward routing terminal; and
    a processing unit parsing the packet to obtain the originator node, the destination node, and the backward packet tag, retrieving the backward routing table in response to the backward packet tag, and when the terminal tag represents the forwarding node is not a backward routing terminal, transmitting the packet to the forwarding node.

12. The system of claim 11, wherein when the terminal tag represents the forwarding node is the backward routing terminal, the processing unit of the backup node further edits the packet to remove the backward packet tag and the information of the originator node from the packet, and transmits the packet to the forwarding node.

13. The system of claim 11, wherein the backward packet tag is recorded in a TOS (Type Of Service) field or a traffic class field of a header of the packet.

14. The system of claim 11, wherein the information of the originator node is recorded in an option filed or an extension header field of a header of the packet.

15. The system of claim 11, wherein the generation of the routing table is performed by building a destination tree from a set of nodes comprising the originator node and the destination node, based on presupposition of a connection breakdown between the originator node and the next node, dividing the destination tree into a first sub-destination tree including the originator node, and a second sub-destination tree including the destination node, determining whether the originator node can directly connect to an adjacent node of the second sub-destination tree, when the originator node cannot directly connect to the adjacent node of the second sub-destination tree, determining whether an upstream node can be found from the destination tree, such that the originator node can connect to the destination node via the upstream node, and when the upstream node can be found, recording the upstream node as the backup node in the routing table, and recording the backward routing tag corresponding to the backup node.

16. The system of claim 11, the generation of the backward routing table is performed by building a destination tree from a set of nodes comprising the backup node and the destination node, based on presupposition of a connection breakdown between the originator node and the next node, dividing the destination tree into a first sub-destination tree including the originator node, and a second sub-destination tree including the destination node, based on the presupposition of the connection breakdown between the originator node and the next node, generating a shortest path from the originator node to the destination node, determining whether the shortest path passes through the backup node, when the shortest path passes through the backup node, recording a specific node next to the backup node in the shortest path as the forwarding node corresponding to the originator node and the destination node in the backward routing table, determining whether the specific node belongs to the second sub-destination tree, and when the specific node belongs to the second sub-destination tree, recording a terminal tag representing the specific node is a backward routing terminal in the backward routing table.

17. A reroute system, comprising:
  a backup node, comprising:
    a storage unit comprising a backward routing table, wherein the backward routing table at least records a forwarding node corresponding to an originator node and a destination node, and a terminal tag representing whether the forwarding node is a backward routing terminal;
    a processing unit receiving and parsing a packet to obtain the originator node, the destination node, and a backward packet tag, retrieving the backward routing table in response to the backward packet tag, and when the terminal tag represents the forwarding node is not a backward routing terminal, transmitting the packet to the forwarding node;
  wherein when the terminal tag represents the forwarding node is the backward routing terminal, the processing unit of the backup node further edits the packet to remove the backward packet tag and the information of the originator node from the packet, and transmits the packet to the forwarding node.

18. The system of claim 17, wherein the backward packet tag is recorded in a TOS (Type Of Service) field or a traffic class field of a header of the packet.

19. The method of claim 17, wherein the information of the originator node is recorded in an option filed or an extension header field of a header of the packet.

20. A non-transitory machine-readable storage medium comprising a computer program, which, when executed, causes a device to perform a method for generation of backward routing information, wherein the method comprises:
- building a destination tree from a set of nodes comprising a backup node corresponding to an originator node and a destination node, wherein the originator node first transmits a packet to a next node connected with the originator node when the originator node wants to transmit the packet to the destination node;
- based on presupposition of a connection breakdown between the originator node and the next node, dividing the destination tree into a first sub-destination tree including the originator node, and a second sub-destination tree including the destination node;
- based on the presupposition of the connection breakdown between the originator node and the next node, generating a shortest path from the originator node to the destination node;
- determining whether the shortest path passes through the backup node;
- when the shortest path passes through the backup node, recording a specific node next to the backup node in the shortest path as the forwarding node corresponding to the originator node and the destination node in a backward routing table;
- determining whether the specific node belongs to the second sub-destination tree; and
- when the specific node belongs to the second sub-destination tree, recording a terminal tag representing the specific node is a backward routing terminal in the backward routing table.

* * * * *